United States Patent [19]

Blanton, Jr. et al.

[11] 4,332,672

[45] * Jun. 1, 1982

[54] PROCESS FOR CONTROLLING SULFUR OXIDES USING AN ALUMINA-IMPREGNATED CATALYST

[75] Inventors: William A. Blanton, Jr., Woodacre; Robert L. Flanders, San Anselmo, both of Calif.

[73] Assignee: Chevron Research Company, San Francisco, Calif.

[ * ] Notice: The portion of the term of this patent subsequent to Jul. 19, 1995, has been disclaimed.

[21] Appl. No.: 923,428

[22] Filed: Jul. 10, 1978

Related U.S. Application Data

[63] Continuation-in-part of Ser. No. 751,640, Dec. 17, 1976, Pat. No. 4,115,249, which is a continuation-in-part of Ser. No. 666,115, Mar. 11, 1976, Pat. No. 4,071,436.

[51] Int. Cl.³ .................. B01J 29/06; C01G 11/04; C01B 17/00
[52] U.S. Cl. .................. 208/120; 208/124; 423/244; 423/563; 252/417; 252/466 R; 252/455 R

[58] Field of Search .............. 423/244 A, 244 R, 563, 423/564; 208/113, 120; 252/455 R, 466 R, 417, 463

[56] References Cited

U.S. PATENT DOCUMENTS

| | | | |
|---|---|---|---|
| 3,158,565 | 11/1964 | Sanford | 208/120 |
| 3,776,854 | 12/1973 | Dautzenberg et al. | 423/244 R |
| 4,071,436 | 1/1978 | Blanton, Jr. et al. | 208/120 |
| 4,115,249 | 9/1978 | Blanton, Jr. et al. | 208/113 |

*Primary Examiner*—Gary P. Straub
*Attorney, Agent, or Firm*—D. A. Newell; R. H. Davies; W. D. Reese

[57] ABSTRACT

Sulfur oxides are removed from flue gas in a catalyst regenerator in a fluid catalyst cracking system while liquid-hydrocarbon product yield from the system is maintained at a high level by heating a nonzeolitic, silica-containing catalyst to 800°–1500° F.; impregnating 0.1 to 25 weight percent aluminum onto the catalyst particles; and cycling the resulting particles through the cracking reactor and catalyst regenerator in the cracking system, the impregnated catalyst being particularly adaptable for cracking heavy, metals-containing feeds such as residua.

3 Claims, No Drawings

PROCESS FOR CONTROLLING SULFUR OXIDES USING AN ALUMINA-IMPREGNATED CATALYST

CROSS REFERENCE

This application is a continuation-in-part of our copending application Ser. No. 751,640, filed on Dec. 17, 1976, now U.S. Pat. No. 4,115,249 which is, in turn, a continuation-in-part of our copending application Ser. No. 666,115, filed on Mar. 11, 1976, now U.S. Pat. No. 4,071,436, the teachings of both of which are incorporated herein by specific reference.

BACKGROUND OF THE INVENTION

This invention relates to a method for reducing the amount of carbon monoxide and sulfur oxide in the flue gas produced in a catalyst regenerator in a fluid catalytic cracking system employing a nonzeolitic, silica-containing cracking catalyst.

Modern hydrocarbon catalytic cracking systems use a moving bed or, more usually, a fluidized bed of a particulate catalyst. The cracking catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 800°–1100° F., in the absence of added molecular hydrogen. The reactions of hydrocarbons in the hydrocarbon stream at this temperature result in deposition of carbonaceous coke on the catalyst particles. The resulting fluid products are thereafter separated from the coked catalyst and are withdrawn from the cracking zone. The coked catalyst is then stripped of volatiles and is passed to a catalyst regeneration zone. In the catalyst regenerator, the coked catalyst is contacted with a gas containing a controlled amount of molecular oxygen to burn off a desired portion of the coke from the catalyst and simultaneously to heat the catalyst to a high temperature desired when the catalyst is again contacted with the hydrocarbon stream in the cracking zone. After regeneration, the catalyst is returned to the cracking zone, to further vaporize the hydrocarbons and catalyst hydrocarbon cracking. The flue gas formed by combustion of coke in the catalyst regenerator is separately removed from the regenerator. This flue gas, which may be treated to remove particulates and carbon monoxide from it, is normally passed into the atmosphere. Concern with control of pollutants in flue gas has resulted in a search for improved methods for controlling such pollutants, particularly sulfur oxides and carbon monoxide.

The amount of conversion obtained in an FCC cracking operation is the volume percent of fresh hydrocarbon feed changed to gasoline and lighter products during the conversion step. The end boiling point of gasoline for the purpose of determining conversion is conventionally defined as 430° F. Conversion is often used as a measure of the severity of a commercial FCC operation. At a given set of operating conditions, a more active catalyst gives a greater conversion than does a less active catalyst. The ability to provide higher conversion in a given FCC unit is desirable in that it allows the FCC unit to be operated in a more flexible manner. Feed throughput in the unit can be increased, or alternatively a higher degree of conversion can be maintained with a constant feed throughput rate. Catalyst selectivity is also important. This can be defined as conversion to products boiling in the range 100°–430° F. Selectivity and activity of catalysts are substantially adversely affected by the accumulation of high metals levels resulting from high metals concentrations in the FCC feed hydrocarbons. Accordingly, it may be necessary or desirable to have a quite rapid turnover of catalyst inventory in FCC systems processing high metals-level feeds.

The hydrocarbon feeds processed in commercial FCC units normally contain sulfur, usually termed "feed sulfur". The concentration of sulfur in heavier feeds is usually relatively high, particularly in residual feeds. Such residual feeds cannot always be treated, as by hydroprocessing, to remove such sulfur, and, as cleaner, lower-boiling feeds become scarcer and more expensive, the refining industry is turning more and more toward processing residual feeds high in metals and sulfur. For this reason, it is contemplated that the use in toto or in part of less expensive nonzeolitic cracking catalysts may be desirable in units processing residual feeds. The use of nonzeolitic catalyst would make rapid catalyst turnover economical, and the rapid catalyst turnover would mitigate the adverse effects of metals contamination of the cracking catalyst.

It has been found that about 2–10% or more of the feed sulfur in a hydrocarbon feedstream processed in an FCC system is invariably transferred from the feed to the catalyst particles as a part of the coke formed on the catalyst particles during cracking. Likewise, metals in the feed, e.g., iron, vanadium and nickel are also deposited on the catalyst. The sulfur deposited on the catalyst, herein termed "coke sulfur", is eventually cycled from the conversion zone along with the coked catalyst into the catalyst regenerator. Thus, about 2–10% or more of the sulfur in the hydrocarbon feed is continuously passed from the cracking zone into the catalyst regeneration zone in the coked catalyst. In an FCC catalyst regenerator, sulfur contained in the coke is burned along with the coke carbon and hydrogen, forming gaseous sulfur dioxide and sulfur trioxide, which are conventionally removed from the regenerator in the flue gas.

Most of the feed sulfur does not become coke sulfur in the cracking reactor. Instead, it is converted either to normally gaseous sulfur compounds such as hydrogen sulfide and carbon oxysulfide, or to normally liquid organic sulfur compounds. These organic sulfur compounds are carried along with the vapor products and recovered from the cracking reactor. About 90% or more of the feed sulfur is thus continuously removed from the cracking reactor in the stream of processed, cracked hydrocarbons, with about 40–60% of this sulfur being in the form of hydrogen sulfide. Provisions are conventionally made to recover hydrogen sulfide from the effluent from the cracking reactor. Typically, a very-low-molecular-weight off-gas vapor stream is separated from the $C_3+$ liquid hydrocarbons in a gas recovery unit, and the off-gas is treated, as by scrubbing it with an amine solution, to remove the hydrogen sulfide. Removal of sulfur compounds such as hydrogen sulfide from the fluid effluent from an FCC cracking reactor is relatively simple and inexpensive compared to removal of sulfur oxides from an FCC regenerator flue gas by conventional methods. Moreover, if all the sulfur which must be recovered from an FCC operation could be recovered in a single recovery operation performed on the reactor off-gas, the necessity for two separate sulfur recovery operations in an FCC unit could be obviated.

It has been suggested to diminish the amount of sulfur oxides in FCC regenerator flue gas by desulfurizing a hydrocarbon feed in a separate desulfurization unit prior to cracking or to desulfurize the regenerator flue gas itself, by a conventional flue gas desulfurization procedure, after removal from the FCC regenerator. Clearly, both of the foregoing alternatives require elaborate, extraneous processing operations and entail large capital and utilities expenses. With a shift toward production of low-sulfur fuel oils, the feed desulfurization capacity of a given refiner may have to be shifted away from FCC feed desulfurization, even in cases where such feed desulfurization is presently available.

If sulfur normally removed from the FCC unit in the regenerator flue gas as sulfur oxides is instead removed from the cracking reactor as hydrogen sulfide along with the processed cracked hydrocarbons, the sulfur thus shifted to the reactor effluent is then simply a small addition to the large amount of hydrogen sulfide and organic sulfur already invariably present in the reactor effluent. The small added expense, if any, of removing even as much as 5–15% more hydrogen sulfide from an FCC reactor off-gas by available means is substantially less than the expense of separate feed desulfurization or flue gas desulfurization to reduce the level of sulfur oxides in the regenerator flue gas. Hydrogen sulfide recovery systems used in present commercial FCC units normally have the capacity to remove additional hydrogen sulfide from the reactor off-gas. Present off-gas hydrogen sulfide recovery facilities could normally handle any additional hydrogen sulfide which would be added to the off-gas if the sulfur normally in the regenerator flue gas were substantially all converted to hydrogen sulfide in the FCC reactor off-gas. It is accordingly desirable to direct substantially all feed sulfur into the fluid cracked products removal pathway from the cracking reactor and reduce the amount of sulfur oxides in the regenerator flue gas.

It has been suggested, e.g., in U.S. Pat. No. 3,699,037, to reduce the amount of sulfur oxides in FCC regenerator flue gas by adding particles of Group IIA metal oxides and/or carbonates, such as dolomite, MgO or $CaCO_3$, to the circulating catalyst in an FCC unit. The Group IIA metals react with sulfur oxides in the flue gas to form solid sulfur-containing compounds. The Group IIA metal oxides lack physical strength, and regardless of the size of the particles introduced, they are rapidly reduced to fines by attrition and rapidly pass out of the FCC unit with the catalyst fines. Thus, addition of dolomite and the like Group IIA materials is a continuous, once-through process, and large amounts of material must be employed, in order to reduce the level of flue gas sulfur oxides for any significant period of time.

It has also been suggested, e.g., in U.S. Pat. No. 3,835,031, to reduce the amount of sulfur oxides in an FCC regenerator flue gas by impregnating a Group IIA metal oxide onto a conventional silica-alumina cracking catalyst. The attrition problem encountered when using unsupported Group IIA metals is thereby reduced. However, it has been found that Group IIA metal oxides, such as magnesia, when used as a component of cracking catalysts, have an undesirable effect on the activity and selectivity of the cracking catalysts. The addition of a Group IIA metal to a cracking catalyst results in two particularly noticeable adverse consequences relative to the results obtained in cracking without the presence of the Group IIA metals: (1) the yield of the liquid hydrocarbon fraction is substantially reduced, typically by greater than 1 volume percent of the feed volume; and (2) the octane rating of the gasoline or naphtha fraction (75°–430° F. boiling range) is substantially reduced. Both of the above-noted adverse consequences are seriously detrimental to the economic viability of an FCC cracking operation and even complete removal of sulfur oxides from regenerator flue gas would not entirely compensate for the losses in yield and octane which result from adding Group IIA metals to an FCC catalyst.

Alumina has been a component of many FCC and other cracking catalysts, but primarily in intimate chemical combination with silica. Alumina itself has little or no acidity and is generally considered to be undesirable for use as a cracking catalyst. The art has taught that alumina is not selective, i.e., the cracked hydrocarbon products recovered from an FCC or other cracking unit using an alumina catalyst would not be desired valuable products, but would include, for example, relatively large amounts of $C_2$ and lighter hydrocarbon gases.

The conventional type of FCC catalyst regeneration currently used in most systems is an incomplete combustion mode. In such systems, referred to herein as "standard regeneration" systems, a substantial amount of coke carbon is left on regenerated catalyst passed from the FCC regeneration zone to the cracking zone. Typically, regenerated catalyst contains a substantial amount of coke carbon, i.e., more than 0.2 weight percent carbon, usually about 0.25 to 0.45 weight percent carbon. The flue gas removed from an FCC regenerator operating in a standard regeneration mode is characterized by a relatively high carbon monoxide/carbon dioxide concentration ratio. The atmosphere in much or all of the regeneration zone is, over-all, a reducing atmosphere because of the presence of substantial amounts of unburned coke carbon and carbon monoxide.

In general, reducing the level of carbon on regenerated catalyst below about 0.2 weight percent has been difficult. Until recently, there has been little incentive to attempt to remove substantially all coke carbon from the catalyst, since a relatively high carbon content has had little adverse effect on the activity and selectivity of amorphous silica-alumina catalysts. Most of the FCC cracking catalysts now used, however, contain zeolites, or molecular sieves. Zeolite-containing catalysts have usually been found to have relatively higher activity and selectivity when their coke carbon content after regeneration is relatively low. An incentive has thus arisen for attempting to reduce the coke content of regenerated zeolitic FCC catalyst to a very low level, e.g., below 0.2 weight percent, but this has not particularly applied to nonzeolitic catalysts.

Zeolitic catalysts are generally highly preferred for catalytic cracking of normal feeds, because their activity and selectivity are high. However, zeolitic catalysts are relatively expensive, so that their use in certain cases may not be practical. For example, in FCC cracking of heavy residual feeds which have not been demetallized, the catalyst rapidly becomes contaminated and deactivated by the metals, and must be discarded after a short period of use. Thus, a nonzeolitic catalyst may be preferred for use in such cases because it is much less expensive and the initial high conversion and selectivity of zeolitic catalysts may not be as important as the expense of using a large amount of catalyst to avoid metals effects. In using either zeolitic or nonzeolitic catalysts, however, the problem of sulfur oxides emissions is encountered.

Several methods have been suggested for burning substantially all carbon monoxide to carbon dioxide during FCC catalyst regeneration, to avoid air pollution, recover heat, and prevent afterburning. Among the procedures suggested for use in obtaining complete carbon monoxide combustion in an FCC regenerator have been: (1) increasing the amount of oxygen introduced into the regenerator relative to standard regeneration; and either (2) increasing the average operating temperature in the regenerator or (3) including various carbon monoxide oxidation promoters in the cracking catalyst to promote carbon monoxide burning. Various solutions have also been suggested for the problem of afterburning of carbon monoxide, such as addition of extraneous combustibles or use of water or heat-accepting solids to absorb the heat of combustion of carbon monoxide.

Complete combustion systems using an unusually high temperature in the catalyst regenerator to accomplish complete carbon monoxide combustion are also not altogether satisfactory. Some of the heat generated by carbon monoxide combustion is lost in the flue gas, because CO combustion takes place essentially in a dilute catalyst phase in an after-burning mode, and high temperatures can permanently adversely affect the activity and selectivity of the FCC catalyst.

Several types of addition of Group VIII noble metals and other carbon monoxide combustion promoters to FCC systems have been suggested in the art. In U.S. Pat. No. 2,647,860 it is proposed to add 0.1-1 weight percent chromic oxide to an FCC catalyst to promote combustion of carbon monoxide to carbon dioxide and to prevent afterburning. U.S. Pat. No. 3,364,136 proposes to employ particles containing a small pore (3-5 A.) molecular sieve with which is associated a transition metal from Groups IB, IIB, VIB, VIIB and VIII of the Periodic Table, or compounds thereof, such as a sulfide or oxide. Representative metals disclosed include chromium, nickel, iron, molybdenum, cobalt, platinum, palladium, copper and zinc. The metal-loaded, small-pore zeolite may be used in an FCC system in physical mixture with cracking catalysts containing larger-pore zeolites active for cracking, or the small-pore zeolite may be included in the same matrix with zeolites active for cracking. The small-pore, metal-loaded zeolites are supplied for the purpose of increasing the $CO_2/CO$ ratio in the flue gas produced in the FCC regenerator. In U.S. Pat. No. 3,788,977, it is proposed to add uranium or platinum impregnated on an inorganic oxide such as alumina to an FCC system, either in physical mixture with FCC catalyst or incorporated into the same amorphous matrix as a zeolite used for cracking. Uranium or platinum is added for the purpose of producing gasoline fractions having high aromatics contents, and no effect on carbon monoxide combustion when using the additive is discussed in the patent. In U.S. Pat. No. 3,808,121 it is proposed to supply large-size particles of a carbon monoxide combustion promoter in an FCC regenerator. The smaller-size catalyst particles are cycled between the FCC cracking reactor and the catalyst regenerator, while, because of their size, the larger promoter particles remain in the regenerator. Carbon monoxide oxidation promoters such as cobalt, copper, nickel, manganese, copper chromite, etc., impregnated on an inorganic oxide such as alumina are disclosed for use. Belgian patent publication No. 820,181 and U.S. Pat. Nos. 4,072,600 and 4,064,039 suggest using catalyst particles containing platinum, palladium, iridium, rhodium, osmium, ruthenium or rhenium or mixtures or compounds thereof to promote carbon monoxide oxidation in an FCC catalyst regenerator. An amount between a trace and 100 ppm of the active metal is added to FCC catalyst particles by incorporation during catalyst manufacture or by addition of a compound of the metal to the hydrocarbon feed to an FCC unit using the catalyst. The publication notes that addition of the promoter metal increases coke and hydrogen formation during cracking. The catalyst containing the promoter metal can be used as such or can be added in physical mixture with unpromoted FCC cracking catalyst.

Applicant's employer and/or affiliates thereof purchased quantities of particulate additives from catalyst manufacturers. The additives were sold by the manufacturers for the purpose of introducing the additives into circulation in admixture with FCC catalyst in FCC units to promote combustion of carbon monoxide during catalyst regeneration in the units. Applicant's employer and/or affiliates thereof used the additives in their commercial FCC operations. One such additive was understood to contain a mixture of platinum-alumina particles and silica-alumina particles.

SUMMARY OF THE INVENTION

In a process for cracking hydrocarbons in the absence of added molecular hydrogen wherein a nonzeolitic cracking catalyst including at least one acidic cracking component from the group consisting of silica-containing nonzeolitic crystalline refractory inorganic oxides and silica-containing amorphous refractory inorganic oxides is cycled between a cracking zone and a catalyst regeneration zone, a sulfur-containing hydrocarbon stream is cracked in contact with said catalyst in said cracking zone, and a sulfur-containing flue gas is formed in said regeneration zone by burning sulfur-containing coke off said nonzeolitic catalyst with an oxygen-containing gas, the method for reducing the amount of carbon monoxide and sulfur oxides in said flue gas which comprises:

(a) heating particles of said nonzeolitic cracking catalyst to a temperature between 800° F. and 1500° F.;

(b) impregnating the resulting nonzeolitic catalyst particles with an amount of an aluminum compound sufficient to add from 0.1 to 25 weight percent aluminum, calculated on an elemental metal basis, to said nonzeolitic catalyst particles;

(c) cycling the resulting impregnated nonzeolitic catalyst particles between said cracking zone and said regeneration zone in said catalytic cracking system;

(d) reacting sulfur oxides in said flue gas with the added aluminum in said catalyst particles to form a sulfur-containing solid in said catalyst particles in said regeneration zone; and (e) forming hydrogen sulfide in said cracking zone by contacting said hydrocarbon feed with said sulfur-containing solid in said catalyst particles and removing the resulting hydrogen sulfide from said cracking zone with said fluid products.

The invention further relates to a composition of matter comprising aluminum for reaction with sulfur oxides and a particulate nonzeolitic cracking catalyst of the type defined above for cracking hydrocarbons in the absence of added hydrogen, prepared by the steps comprising:

(a) heating particles of said cracking catalyst to a temperature between 800° F. and 1500° F.; and (b) impregnating the resulting catalyst particles with an amount of an aluminum compound sufficient to add from 0.1 to 25 weight percent aluminum, calculated on an elemental metal basis, to said catalyst particles.

By heating a silica-containing amorphous cracking catalyst to 800°–1500° F. and then impregnating the catalyst with an aluminum compound, the aluminum thereby added is a superior reactant for removing sulfur oxides from FCC regenerator flue gas. Unless the silica-containing catalyst particles are heated prior to aluminum addition, the added aluminum is not an effective reactant. Apparently, the added alumina interacts with the silica content of noncalcined catalysts to deactivate the added material.

The aluminum compound-impregnated cracking catalyst can be used to remove sulfur compounds from the regenerator flue gas without substantially adversely affecting the activity and selectivity obtained in the FCC system with the same cracking catalyst before impregnation. the yield of liquid hydrocarbon product from an FCC process can be maintained at substantially the same level as can be obtained with the same catalyst without impregnating the catalyst. The added aluminum does not have a substantial adverse effect on the octane number of the gasoline fraction formed in the FCC system. Sulfur oxides react with the added aluminum to form a sulfur-containing solid in the nonzeolitic catalyst, and are thereby removed from the FCC flue gas before the gas leaves the regenerator. The nonzeolitic catalyst particles, with the sulfur-containing solid therein, are then passed to the hydrocarbon cracking section of the FCC unit and contacted therein with the hydrocarbon feed. The sulfur-containing solid reacts with the hydrocarbon feed material, forming hydrogen sulfide, which is carried out of the FCC reactor in the off-gas component of the fluid products stream. The exit path of sulfur from the FCC unit is thereby shifted from the regenerator flue gas removal means to the FCC reactor fluid effluent removal means, so that substantially all the feed sulfur can be easily and economically handled by a conventional fluid products handling system.

We have found that by employing a nonzeolitic cracking catalyst (e.g., for cracking metals containing residual feeds) in connection with using alumina put into the catalyst according to the invention to remove sulfur oxides from the regenerator flue gas, that the level of sulfur oxides can be substantially reduced while the use of the inexpensive nonzeolitic catalyst permits rapid turnover (replacement) of catalyst to overcome the adverse effects of metals contamination.

DETAILED DESCRIPTION OF THE INVENTION

The present invention is used in connection with a fluid catalyst cracking process for cracking hydrocarbon feeds. The same sulfur-containing hydrocarbon feed normally processed in commercial FCC systems may be processed in a cracking system employing the present invention. Suitable feedstocks include, for example, gas oils, light cycle oils, heavy cycle oils, etc., which usually contain about 0.1–10 weight percent sulfur. Sulfur may be present in the feed as a thiophene, disulfide, thioether, etc. Suitable feedstocks normally boil in the range from about 400°–1100° F. or higher. A suitable feed may include recycled hydrocarbons which have already been cracked. Atmospheric and vacuum residual fractions are particularly suitable and preferred materials for use in feeds processed according to the present invention, especially heavy feeds containing relatively high concentrations of contaminant metals.

The cracking catalyst employed may be a conventional particulate, nonzeolitic cracking catalyst including silica, and preferably including alumina. The catalyst used in the present process contains at least one active, acidic cracking component selected from the group consisting of silica-containing, nonzeolitic, crystalline, refractory inorganic oxides and silica-containing, amorphous, refractory inorganic oxides. The acidic component must include at least 10 weight percent silica and preferably includes at least 20 weight percent silica. Examples of suitable acidic crystalline materials are natural and synthetic clays, acid-treated clays and the like. Examples of suitable amorphous materials are amorphous, natural or synthetic silica-alumina, silica-magnesia, silica-alumina-magnesia, silica-zirconia, etc. Acidic, nonzeolitic, refractory inorganic oxides containing silica and alumina are preferred. Examples of suitable materials include kaolin clays, silica-containing gels and cogels, etc. Refractory inorganic oxides may include one or more of alumina, magnesia, zirconia, thoria, titania and the like. Those skilled in the art will be familiar with a large number of suitable nonzeolitic catalysts, in that such catalysts were the predominant type used in FCC operations prior to introduction of zeolitic catalysts.

Zeolitic cracking catalysts are those containing a crystalline aluminosilicate zeolite as an active, acidic cracking component. Crystalline aluminosilicate zeolites have a regular, three-dimensional crystal structure defining pores, channels and/or cells having molecular dimensions. They are commonly referred to as molecular sieves. Zeolitic catalysts are very highly acidic, and have a substantially higher cracking activity than, for example, amorphous silica-alumina catalysts. The acidity and activity of a cracking catalyst can be measured by any of several tests known to those skilled in the art. Activity tests are described or referenced in U.S. Pat. Nos. 4,010,116; 3,957,689; 3,976,598; 3,816,342 and 3,048,536, the complete disclosures of which are incorporated herein by specific reference.

Cracking conditions employed in the cracking or conversion step in an FCC system are frequently provided in part by pre-heating or heat-exchanging hydrocarbon feeds to bring them to a temperature of about 600°–750° F. before introducing them into the cracking zone; however, pre-heating of the feed is not essential. Cracking conditions include a catalyst/hydrocarbon weight ratio of about 3–10. A hydrocarbon weight space velocity in the cracking zone of about 2–50 per hour is preferably used. The average amount of coke contained in the catalyst after contact with the hydrocarbons in the cracking zone, when the catalyst is passed to the regenerator, is preferably between about 0.5 weight percent and about 25 weight percent, depending in part on the carbon content of regenerated catalyst in the particular system, as well as the heat balance of the particular system.

The catalyst regeneration zone used in an FCC system employing an embodiment of the present invention may be of conventional design. The gaseous atmosphere inside the regeneration zone is normally comprised of a mixture of gases in concentrations which vary according to the locus within the regenerator. The concentrations of gases also vary according to the coke concentration on catalyst particles entering the regenerator and according to the amount of molecular oxygen and steam passed into the regenerator. Generally, the gaseous atmosphere in a regenerator contains 5–25% steam, varying amounts of oxygen, carbon monoxide, nitrogen, carbon dioxide, sulfur dioxide, and sulfur trioxide. In order to facilitate removal of sulfur contents from the regenerator flue gas within the regenerator according to the invention, it is preferred that relatively coke-free nonzeolitic catalyst particles containing active alumina must contact the gaseous regenerator atmosphere at a locus at which the atmosphere contains sulfur trioxide or molecular oxygen and sulfur dioxide. In regenerators of conventional design, the flue gas includes the desired components and catalyst normally contacts the flue gas at this point, after having been freed of a substantial amount of coke. When regenerators of this type are employed, contact between relatively coke-free alumina-containing nonzeolitic catalyst particles and the oxygen and sulfur dioxide or sulfur trioxide is facilitated.

The composition of the present invention is formed by selecting the particulate silica-containing nonzeolitic cracking catalyst desired for use in a particular cracking system according to criteria known in the art, and then heat treating the nonzeolitic catalyst particles and impregnating them with an aluminum compound. Thus, the nonzeolitic cracking catalyst employed may be selected on the basis of activity, selectivity, expense, etc., without regard to the heating and impregnation steps of this invention, with selection being based on commercial factors well known to those skilled in the art and not forming any part of the invention. All known commercially used cracking catalysts include a substantial amount of silica.

The selected nonzeolitic catalyst is first heated to a temperature of 800° F. to 1500° F. Preferably the catalyst is heated to a temperature between 1000° F. and 1400° F. The length of time of the heat treatment step is not critical, but should be at least 15 minutes, and preferably at least several hours. The heat treating step may be performed in a vacuum, in an inert atmosphere such as nitrogen, carbon dioxide, argon, etc., in an oxygen-containing gas such as air, in a reducing gas such as hydrogen, carbon monoxide, etc. The heating step may be performed in the presence of steam, if desired. Preferably, the heating step includes passing a heated gas stream in contact with the catalyst particles to be treated and then withdrawing the gas from contact. The heat treatment may take the form of conventional calcination, for example.

The heat treatment may also be performed by using the particulate nonzeolitic, silica-containing catalyst in a catalytic cracking system wherein the cracking conditions and/or regeneration conditions include a temperature within the 800°–1500° F. range. Thus, nonzeolitic cracking catalyst which has been used in a conventional fluid catalytic cracking operation, e.g., equilibrium nonzeolitic catalyst, is adequately heat treated according to the present invention, since catalytic cracking conditions normally include both a cracking temperature and a regeneration temperature between 800° F. and 1500° F.

After heating the nonzeolitic catalyst particles to 800°–1500° F., an aluminum compound is impregnated on the particles. The aluminum compound may be added, for example, by aqueous impregnation of the nonzeolitic catalyst particles with a soluble aluminum salt such as aluminum sulfate, aluminum acetate or aluminum nitrate. An organic liquid may also be used as the impregnating medium. Aqueous impregnation of an aluminum sulfate solution is the preferred method for aluminum addition according to the invention. The amount of aluminum added, calculated as the elemental metal, is from 0.1 to 25 weight percent of the weight of the nonzeolitic catalyst after heating and prior to impregnation. Preferably, from 0.1 to 10 weight percent aluminum is added.

After impregnation of the aluminum compound, the resulting nonzeolitic catalyst particles may be used directly in a catalytic cracking system.

In addition to an aluminum compound, various promoters can be added to the nonzeolitic cracking catalyst after heating, such as vanadium, chromium, iron, uranium or mixtures thereof. Vanadium is a preferred promoter metal. The promoter metals are added in an amount between 0.01 and 10 weight percent of the amount of added aluminum, calculated on the basis of the elemental promoter metal content. Preferably the promoter metals are present in the nonzeolitic catalyst particles in an amount between 0.05 and 2 weight percent of the amount of added aluminum. Promoter metals may be added to the catalyst particles prior to impregnation of the aluminum compound, with the aluminum compound, or after the aluminum compound, as by the use of an aqueous or organic solution of the desired metal or metals. Likewise, any known method for combining the promoters with the catalyst particles may appropriately be used. The particulate nonzeolitic cracking catalyst employed is preferably one including more than 10 weight percent silica, prior to impregnation, with a silica content of at least 30 weight percent being particularly preferred. Preferred catalysts are those containing combined silica and alumina, with greater than 10% silica.

Impregnated aluminum contained in the nonzeolitic catalyst particles reacts with the sulfur oxides contained in the flue gas within the regeneration zone to form a sulfur-containing solid, such as aluminum sulfate. The catalyst particles are then removed from the regeneration zone, freeing the flue gas from a substantial portion of the sulfur compounds therein. The flue gas withdrawn from the regeneration zone thus has a diminished sulfur content. The sulfur-containing nonzeolitic catalyst particles are then passed to the cracking zone and are contacted therein with the hydrocarbon feed stream in the conventional manner. By contacting the catalyst particles having a sulfur-containing solid component with the feed at cracking conditions, the reaction between the sulfur-containing solid and components of the feed forms hydrogen sulfide. This incremental hydrogen sulfide is removed from the cracking zone along with the large amount of hydrogen sulfide normally formed in the cracking zone. Thus, no particular departures need be made from the conventional operating steps used in the cracking or conversion section of an FCC system when using an embodiment of the invention.

Waste gases from other refinery operations which contain sulfur oxides, dilute hydrogen sulfide, etc., may be passed into an FCC catalyst regenerator for disposal in some cases. The sulfur component of such gases can thereby be reacted with aluminum in the nonzeolitic catalyst particles to form a sulfur-containing solid in the catalyst particles in the regenerator. The sulfur-containing solid is then reacted with components of the hydrocarbon stream in the cracking section of the FCC unit to form a further incremental amount of hydrogen sulfide in the reactor. The further incremental hydrogen sulfide is simply recovered with the rest of the off-gas hydrogen sulfide, e.g. in an amine scrubbing operation.

The following illustrative embodiment describes a preferred embodiment of the operation of the present invention.

ILLUSTRATIVE EMBODIMENT

A conventional FCC system and equilibrium amorphous, acidic silica-alumina, cracking catalyst of a commercially available type are employed for cracking about 19,000 barrels per day of a feed including 10 volume percent of a highly metals-contaminated residual hydrocarbon stock. The feed contains about 1.0 weight percent feed sulfur. The cracking zone used contains a combination of riser cracking and dense-bed cracking modes. Cracking conditions employed include a reactor temperature of about 920° F., a hydrocarbon weight hourly space velocity of about 5 per hour and a conversion rate (defined as percent of feed converted to 430° F. and lighter components) of about 65%. The average amount of coke on spent catalyst is about 0.95 weight percent. The coke on spent catalyst includes about 1.0 weight percent sulfur. The amount of carbon on regenerated catalyst is about 0.4 weight percent. The flue gas exiting the catalyst regenerator includes about 700 parts per million (volume) sulfur oxides (calculated as sulfur dioxide), about 0.3 volume percent oxygen, and has a $CO/CO_2$ ratio of about 1.0. Catalyst regeneration conditions used in the regeneration zone include a temperature of about 1200° F. Catalyst is circulated continuously between the cracking zone and regeneration zone at the rate of about 15 tons per minute, with a total catalyst inventory in the system of about 180 tons. According to the invention, the amorphous silica-alumina catalyst particles are heat treated at 1200° F. by use in the FCC system in conventional operation. The catalyst particles are then withdrawn from the system and impregnated with a sufficient amount of an aqueous aluminum sulfate solution to provide 1.0 weight percent aluminum, based on the catalyst weight prior to impregnation. The particles are then replaced in the FCC system and used as the catalyst. Aluminum added to the nonzeolitic catalyst particles by impregnation is at least partly converted to alumina at cracking and regeneration conditions. In conventional operation of this FCC system, without benefit of the present invention, a flue gas containing 700 ppm sulfur oxides, or 99 pounds per hour of sulfur, would have been removed from the regenerator. According to the present invention, the cracking catalyst has been heated to 1200° F. by prior catalytic use in the FCC system and then impregnated with 1.0 weight percent aluminum. The sulfur oxides from the regenerator flue gas and the alumina in the catalyst particles resulting from oxidation of the impregnated aluminum react to form a sulfur-containing solid as a component of the catalyst. The average residence time of the impregnated catalyst particles in the regenerator is 8 minutes. The nonzeolitic catalyst particles having a sulfur-containing solid therein are removed from the regenerator at the rate of 1,800,000 pounds per hour. About 94 pounds per hour of sulfur is removed from the flue gas in the regenerator as a solid component of the catalyst particles. The flue gas removed from the regenerator has a sulfur oxides concentration of only about 100 ppm. Thus, about 94 pounds per hour of sulfur are transferred from the regenerator flue gas removal stream into the reactor off-gas removal stream in the FCC system. The sulfur-containing solid in the catalyst particles is contacted with the hydrocarbon feed in the reactor section of the system. Reaction between components of the hydrocarbon feed and the sulfur-containing solid results in the formation of an incremental amount of hydrogen sulfide in addition to the much larger amount of hydrogen sulfide conventionally formed by the hydrocarbon cracking reactions in the reactor. The incremental amount of hydrogen sulfide released from the nonzeolitic catalyst particles into the fluid products stream and thereafter withdrawn from the reactor-separator is only about 8 weight percent of the amount of hydrogen sulfide already generated in the reactor in conventional operation. When not practicing the present invention, about 1,200 pounds per hour of hydrogen sulfide would normally be withdrawn as an off gas component from the reactor-separator. On the other hand, the relative amount of sulfur compounds removed from the flue gas within the regenerator is very substantial compared to the amount of sulfur compounds in the flue gas. The concentration of sulfur-containing compounds in the flue gas finally removed from the regenerator, when operating according to the present invention, is only 100 ppm sulfur oxides, or 5 pounds of sulfur withdrawn per hour.

What is claimed is:

1. In a process for cracking hydrocarbons in the absence of added molecular hydrogen wherein a nonzeolitic cracking catalyst including of at least one acidic cracking component from the group consisting of silica-containing nonzeolitic crystalline refractory inorganic oxides and silica-containing amorphous refractory inorganic oxides is cycled between a cracking zone and a catalyst regeneration zone, a sulfur-containing hydrocarbon stream is cracked in contact with said catalyst in said cracking zone, and a sulfur-containing flue gas is formed in said regeneration zone by burning sulfur-containing coke off said nonzeolitic catalyst with an oxygen-containing gas, the method for reducing the amount of carbon monoxide and sulfur oxides in said flue gas which comprises:

(a) heating particles of said nonzeolitic cracking catalyst to a temperature between 800° F. and 1500° F.;

(b) impregnating the resulting nonzeolitic catalyst particles with an amount of an aluminum compound sufficient to add from 0.1 to 25 weight percent aluminum, calculated on an elemental metal basis, to said nonzeolitic catalyst particles;

(c) cycling the resulting impregnated nonzeolitic catalyst particles between said cracking zone and said regeneration zone in said catalytic cracking system;

(d) reacting sulfur oxides in said flue gas with the added aluminum in said catalyst particles to form a sulfur-containing solid in said catalyst particles in said regeneration zone; and (e) forming hydrogen sulfide in said cracking zone by contacting said hydrocarbon feed with said sulfur-containing solid in said catalyst particles and removing the resulting hydrogen sulfide from said cracking zone with said fluid products.

2. A method according to claim 1 wherein 0.1 to 10 weight percent aluminum is added to said nonzeolitic catalyst particles.

3. A method according to claim 1 wherein said nonzeolitic catalyst particles are heated to a temperature between 1000° F. and 1400° F. prior to impregnation with said aluminum compound.

* * * * *